United States Patent
Bricard et al.

(10) Patent No.: US 11,426,612 B2
(45) Date of Patent: Aug. 30, 2022

(54) OXYGEN SUPPLY SYSTEM AND METHOD FOR PROVIDING AN ADEQUATE OXYGEN SUPPLY MODE IN AN AIRCRAFT

(71) Applicant: AIRBUS OPERATIONS GMBH, Hamburg (DE)

(72) Inventors: Patrick Bricard, Hamburg (DE); Timo Martin, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 830 days.

(21) Appl. No.: 15/196,279

(22) Filed: Jun. 29, 2016

(65) Prior Publication Data
US 2017/0001047 A1    Jan. 5, 2017

(30) Foreign Application Priority Data
Jun. 30, 2015    (EP) .................................. 15174644

(51) Int. Cl.
*A62B 7/14*    (2006.01)
*B64D 13/00*    (2006.01)
(Continued)

(52) U.S. Cl.
CPC .................. *A62B 7/14* (2013.01); *A62B 7/02* (2013.01); *A62B 9/006* (2013.01); *A62B 9/04* (2013.01);
(Continued)

(58) Field of Classification Search
CPC ......... A62B 18/02; A62B 9/022; A62B 9/006; A62B 9/027; A62B 7/14; A62B 7/02;
(Continued)

(56) References Cited

U.S. PATENT DOCUMENTS 3,782,402 A    1/1974    Cramer et al.
4,328,798 A *  5/1982    Isaacson .................. A62B 7/02
                                                     128/202.27
(Continued)

FOREIGN PATENT DOCUMENTS

WO    WO 2012/114145 A1    8/2012

OTHER PUBLICATIONS

Extended European Search Report for European Application No. 15174644.3 dated Dec. 22, 2015.
(Continued)

*Primary Examiner* — Joseph D. Boecker
*Assistant Examiner* — Brian T Khong
(74) *Attorney, Agent, or Firm* — Jenkins, Wilson, Taylor & Hunt, P.A.

(57) ABSTRACT

An oxygen supply system providing an adequate oxygen supply mode in an aircraft. A preventive oxygen supply system includes an oxygen source, a preventive oxygen dispensing unit connectable to the oxygen source, a cabin altitude detection device, and a preventive oxygen control device provide at least the following modes: a pre-wear mode providing no oxygen of the oxygen source to the preventive oxygen dispensing unit but normal cabin air; a pre-oxygenation mode providing a predetermined rate of oxygen of the oxygen source to the preventive oxygen dispensing unit sufficient for generating a pre-oxygenation condition of the user; and a decompression mode providing high concentrated oxygen of the oxygen source to the preventive oxygen dispensing unit sufficient for ensuring a minimum oxygenation of the user. The preventive oxygen control device automatically switches to the decompression mode in case a predetermined cabin altitude threshold is detected by the cabin altitude detection device.

14 Claims, 2 Drawing Sheets

(51) Int. Cl.
*A62B 7/02* (2006.01)
*A62B 9/00* (2006.01)
*A62B 9/04* (2006.01)
*A62B 18/02* (2006.01)

(52) U.S. Cl.
CPC .............. *A62B 18/02* (2013.01); *B64D 13/00* (2013.01); *B64D 2231/00* (2013.01); *B64D 2231/025* (2013.01)

(58) Field of Classification Search
CPC ........ B64D 13/02; B64D 13/04; B64D 13/06; B64D 2013/0681; B64D 2013/0688; B64D 2013/0677; B64D 2231/00; B64D 2231/02; B64D 2231/025; B01D 2259/4575
See application file for complete search history.

(56) References Cited

U.S. PATENT DOCUMENTS

| | | | | |
|---|---|---|---|---|
| 4,651,728 A * | 3/1987 | Gupta | ................... | A62B 7/14 128/201.28 |
| 4,919,124 A * | 4/1990 | Stevenson | ................ | A62B 7/14 128/202.26 |
| 4,928,682 A * | 5/1990 | Stevenson | ................ | A62B 7/14 128/202.26 |
| 5,022,393 A * | 6/1991 | McGrady | ................ | A62B 7/14 128/204.21 |
| 5,809,999 A * | 9/1998 | Lang | ........................ | A62B 7/14 128/200.24 |
| 6,244,540 B1 * | 6/2001 | Stabile | .................... | A62B 7/14 244/118.5 |
| 6,507,776 B1 * | 1/2003 | Fox, III | ............... | G05D 1/0055 244/180 |
| 7,255,104 B2 * | 8/2007 | Phillips | .................... | A62B 7/14 128/204.18 |
| 9,089,721 B1 * | 7/2015 | Horstman | ................ | A62B 7/14 |
| 2003/0034071 A1 * | 2/2003 | Jackson | ................ | A62B 9/027 137/489 |
| 2004/0242981 A1 * | 12/2004 | Pattisapu | ........... | A61B 5/14551 600/323 |
| 2004/0244797 A1 * | 12/2004 | Jackson | ................ | A62B 9/027 128/205.24 |
| 2004/0245390 A1 * | 12/2004 | Meckes | .................... | A62B 7/14 244/118.5 |
| 2007/0062371 A1 * | 3/2007 | Eilers | ....................... | A62B 7/14 95/138 |
| 2007/0107727 A1 * | 5/2007 | Brichetto | ................ | A62B 7/14 128/204.18 |
| 2009/0165802 A1 * | 7/2009 | Farajallah | ................ | A62B 7/02 128/205.24 |
| 2009/0301489 A1 * | 12/2009 | Bloch | ....................... | A62B 7/14 128/204.23 |
| 2009/0314296 A1 * | 12/2009 | Cannon | .................... | A62B 7/14 128/205.25 |
| 2010/0012116 A1 * | 1/2010 | Rittner | .................... | A62B 7/08 128/202.26 |
| 2013/0160768 A1 | 6/2013 | Guering | | |
| 2013/0306073 A1 * | 11/2013 | Fromage | ................. | A62B 7/14 128/204.22 |
| 2013/0312745 A1 * | 11/2013 | Kshirsagar | ............ | B64D 11/00 128/202.26 |

OTHER PUBLICATIONS

European Office Action for Application No. 15174644.3 dated May 21, 2021.

* cited by examiner

OXYGEN SUPPLY SYSTEM AND METHOD FOR PROVIDING AN ADEQUATE OXYGEN SUPPLY MODE IN AN AIRCRAFT

CROSS-REFERENCE TO RELATED APPLICATION

This application claims priority to EP 15 174 644.3 filed Jun. 30, 2015, the entire disclosure of which is incorporated by reference herein.

TECHNICAL FIELD

The present disclosure relates to an oxygen supply system and to a method for providing an adequate oxygen supply mode in an aircraft.

BACKGROUND

Although the present disclosure is not limited to any passenger or user of an aircraft, the present disclosure will be described in view of an aircraft pilot or a flight crew member of an aircraft.

Aircraft pilot herein includes the pilot in addition to the copilot, as well as possibly any person participating in flying of an aircraft and who is seated in the flight deck to assist the pilot and/or the copilot in flying operations or functions linked to the specificities of the aircraft concerned. In the context of commercial flights, for transport of passengers or goods, there generally is a pilot and a copilot. In certain aircrafts, more often than not military, a third man is required to be seated in the flight deck so as to take care of specific functions which may vary according to the flight missions of the aircraft.

An aircraft intended for transport of passengers generally comprises a cockpit in which a pilot and a copilot are seated and a cabin intended to accommodate the passengers. An oxygen mask supplied by a system is associated with each seat of the passenger cabin. There also generally exists an emergency system, being independent of the system supplying the oxygen masks intended for the passengers, for the flight crew located in the cockpit of the aircraft. This emergency system provided for the occupants of the cockpit consists mainly of one or more oxygen cylinders, oxygen masks and a circuit connecting the cylinders to the masks.

The oxygen cylinders sometimes are installed directly in the cockpit of the aircraft for example in a compartment located beneath the flight deck. The oxygen masks are stowed closed to the seats for the pilot and the copilot. They are found in particular in the side spaces to the right and to the left of the pilots, in the flight deck, these side spaces commonly being called "consoles". Thus, an oxygen mask generally is found to the left of the pilot and to the right of the copilot. A circuit generally comprising both rigid ducts and flexible ducts makes it possible to ensure distribution of the oxygen to the occupants of the cockpit. This circuit also integrates components making it possible to adjust the flow and the pressure of the oxygen delivered to the oxygen masks.

Such an oxygen supply is for example described in document US 2013/0160768 A1.

Some national or international flight regulation requires one pilot to use his or her oxygen mask as preventive means in specific situations, for example when flying above flight level FL410, i.e. flying above 41,000 feet, in order to ensure that the pilot is always prepared for a decompression situation during the flight.

Furthermore, the current emergency oxygen masks have been designed for short emergency situations wherein the masks are rigidly installed and integrated in the emergency oxygen supply system of the aircraft.

SUMMARY

It is one of the ideas of the present disclosure to provide an improved oxygen supply system and an improved method for providing an adequate oxygen supply mode to the pilot of an aircraft.

According to a first aspect of the present disclosure, an oxygen supply system is provided for providing an adequate oxygen supply mode in an aircraft having a preventive oxygen supply system comprising: an oxygen source; a preventive oxygen dispensing unit being connectable to the oxygen source; a cabin altitude detection device; and a preventive oxygen control device being adapted to provide at least the following modes: a pre-wear mode for providing no oxygen of the oxygen source to the preventive oxygen dispensing unit but normal cabin air; a pre-oxygenation mode for providing a predetermined rate of oxygen of the oxygen source to the preventive oxygen dispensing unit being sufficient for generating a pre-oxygenation condition of the user; and a decompression mode for providing high concentrated oxygen of the oxygen source to the preventive oxygen dispensing unit being sufficient for ensuring a minimum oxygenation of the user; wherein the preventive oxygen control device automatically switches to the decompression mode in case a predetermined cabin altitude threshold is detected by the cabin altitude detection device.

The oxygen supply system of the present disclosure advantageously can ensure an adequate oxygen supply mode for a pilot of an aircraft wherein the pilot has the possibility to fulfill the regulation with minimized disturbance and without having the need for using the rigidly installed mask of the emergency oxygen supply system over a longer period while ensuring an equivalent level of safety.

In a possible embodiment of the oxygen supply system according to the first aspect of the present disclosure, the oxygen source comprises a high pressure oxygen cylinder and/or an on-board oxygen generating system. It is also possible that the oxygen supply system of the present disclosure comprises two or more oxygen sources being independent from each other or being linked together in a specific manner.

In a further possible embodiment of the oxygen supply system according to the first aspect of the present disclosure, the preventive oxygen dispensing unit comprises a mask, a nasal cannula or the same, wherein the preventive oxygen dispensing unit might be formed as a personalized preventive oxygen dispensing unit. In particular, the personalized preventive oxygen dispensing unit is adapted in size, fit and/or comfort to the specific needs of the respective user. Hence, each user can advantageously carry and use his or her own preventive oxygen dispensing unit, connect it to the preventive oxygen supply system in order to increase the comfort, the health and the hygiene during use since the respective oxygen dispensing units do not have to be shared between different pilots.

In a still further possible embodiment of the oxygen supply system according to the first aspect of the present disclosure, the preventive oxygen control device comprises a manual switch for switching on and/or switching off the preventive oxygen control device.

In a further possible embodiment of the oxygen supply system according to the first aspect of the present disclosure, the preventive oxygen control device comprises an indicating device for indicating the actual mode of the preventive oxygen control device to the user, in particular in form of a visual signal, for example by a display, a LED lamp or the same. It is of course also possible to use other indication signs like haptic or acoustic signals.

In a further possible embodiment of the oxygen system according to the first aspect of the present disclosure, the oxygen dispensing unit is connectable to the oxygen source by an interface, for example by a mechanical connection like a bayonet nut connector or the same. It is possible that either the preventive oxygen dispensing unit already comprises a specific conduit for connecting it to the system or that such a conduit is already part of the installed system being connected to the respective preventive oxygen dispensing unit.

In a possible embodiment of the oxygen supply system according to the first aspect of the present disclosure, the oxygen supply system further comprises an emergency oxygen supply system having an emergency oxygen mask being automatically provided with oxygen in case of using the emergency oxygen mask, in particular wherein the preventive oxygen control device can be coupled to the emergency oxygen supply system such that the preventive oxygen control device shuts down automatically in case it receives a signal indicating the correct functioning of the emergency oxygen supply system. Hence, it is advantageously secured that the user is always provided within sufficient amount of oxygen and that no oxygen is wasted in case the respective oxygen supply system is replaced by another one and not used any more.

In a further possible embodiment of the supply system according to the first aspect of the present disclosure, the oxygen supply system is coupled with an automatic descent profile device supporting the aircraft to perform a possible emergency descent in case the decompression mode of the preventive oxygen control device is activated. Hence, an additional safety measure is implemented advantageously in connection with the present oxygen supply system.

According to a second aspect of the present disclosure, a method is provided for providing an adequate oxygen supply mode in an aircraft comprising: an oxygen supply system having a preventive oxygen supply system comprising an oxygen source; a preventive oxygen dispensing unit being connectable to the oxygen source; a cabin altitude detection device; and a preventive oxygen control device, wherein the preventive oxygen control device is switchable between at least the following modes: a pre-wear mode for providing no oxygen of the oxygen source to the preventive oxygen dispensing unit but normal cabin air; a pre-oxygenation mode for providing a predetermined rate of oxygen of the oxygen source to the preventive oxygen dispensing unit being sufficient for generating a pre-oxygenation condition of the user; and a decompression mode for providing high concentrated oxygen of the oxygen source to the preventive oxygen dispensing unit being sufficient for ensuring a minimum oxygenation of the user; wherein the preventive oxygen control device is automatically switched to the decompression mode in case a predetermined cabin altitude threshold is detected by the cabin altitude detection device.

Hence, a method is provided having the benefit of providing an adequate oxygen supply mode making it possible for the pilot to fulfill the regulation standards with minimized disturbance while ensuring an equivalent level of safety.

Furthermore, with such a method, each pilot can use its own oxygen dispensing unit being personalized. Hence, the preventive oxygen dispensing unit belongs to a specific pilot and is not shared with other pilots. Several sizes of the preventive oxygen dispensing unit can be made available to ensure best fit at maximum comfort.

In a possible embodiment of the method for providing an adequate oxygen supply mode according to the second aspect of the present disclosure, a selection whether the pre-wear mode or the pre-oxygenation mode is used is made manually by the user. Hence, it is ensured that no oxygen of the oxygen source is wasted and that the pilot activates the preventive oxygen control device in case the aircraft has reached a predetermined flight level.

In a still further possible embodiment of the method for providing an adequate oxygen supply mode in an aircraft according to the second aspect of the disclosure herein, the cabin altitude threshold is determined depending on for example national flight regulations, the aircraft type, the number and/or qualification of the single crew members, pilots and copilots, and possibly on further parameters in addition or alternatively. Hence, the threshold is advantageously adapted to the specific flight situation in order to provide the respective required oxygen supply.

In a further possible embodiment of the method for providing an adequate oxygen supply mode according to the second aspect of the present disclosure, an emergency oxygen system having an emergency oxygen mask being automatically provided with oxygen in case of being used by the user is integrated in the oxygen supply system, in particular wherein that preventive oxygen control device shuts down automatically in case it receives a signal indicating the correct functioning of the emergency oxygen system. Hence, it is ensured that the pilot is protected against hypoxia in case of a cabin decompression all the time wherein no oxygen is wasted in case a specific system is not used any more.

In a further possible embodiment of the method for providing an adequate oxygen supply mode according to the second aspect of the present disclosure, the aircraft is urged to perform an emergency descent by an automatic descent profile device in case the decompression mode of the preventive oxygen control device is activated. Hence, an additional security measure is provided for ensuring an oxygen supply to the pilot.

According to a third aspect of the present disclosure, an aircraft is provided comprising an oxygen supply system according to the first aspect of the present disclosure.

BRIEF DESCRIPTION OF THE DRAWINGS

For a more complete understanding of the different aspects of the present disclosure and the advantages thereof, exemplary embodiments of the disclosure herein are explained in more detail in the following description with reference to the accompanying drawings, in which like reference characters designate like parts and in which.

DETAILED DESCRIPTION

The accompanying drawings are included to provide a further understanding of the different aspects of the present disclosure and are incorporated in and constitute a part of the specification. The drawings illustrate particular embodiments of the present disclosure and together with the description do serve to explain the principles underlying the present disclosure. Other embodiments of the disclosure herein and many advantages of the disclosure herein will be readily appreciated as they become better understood with reference to the following detailed description. It will be appreciated that common and/or well understood elements that may be useful or necessary in a commercially feasible embodiment are not necessary depicted in order to facilitate a more abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to a sequence is not necessary required. It will also be understood that the terms and expressions used in the present specification have the ordinary meaning as is accorded to such terms and expressions with respect to their corresponding respective areas of inquiry and study, except where specific meanings have otherwise been set forth herein.

Figure 1:
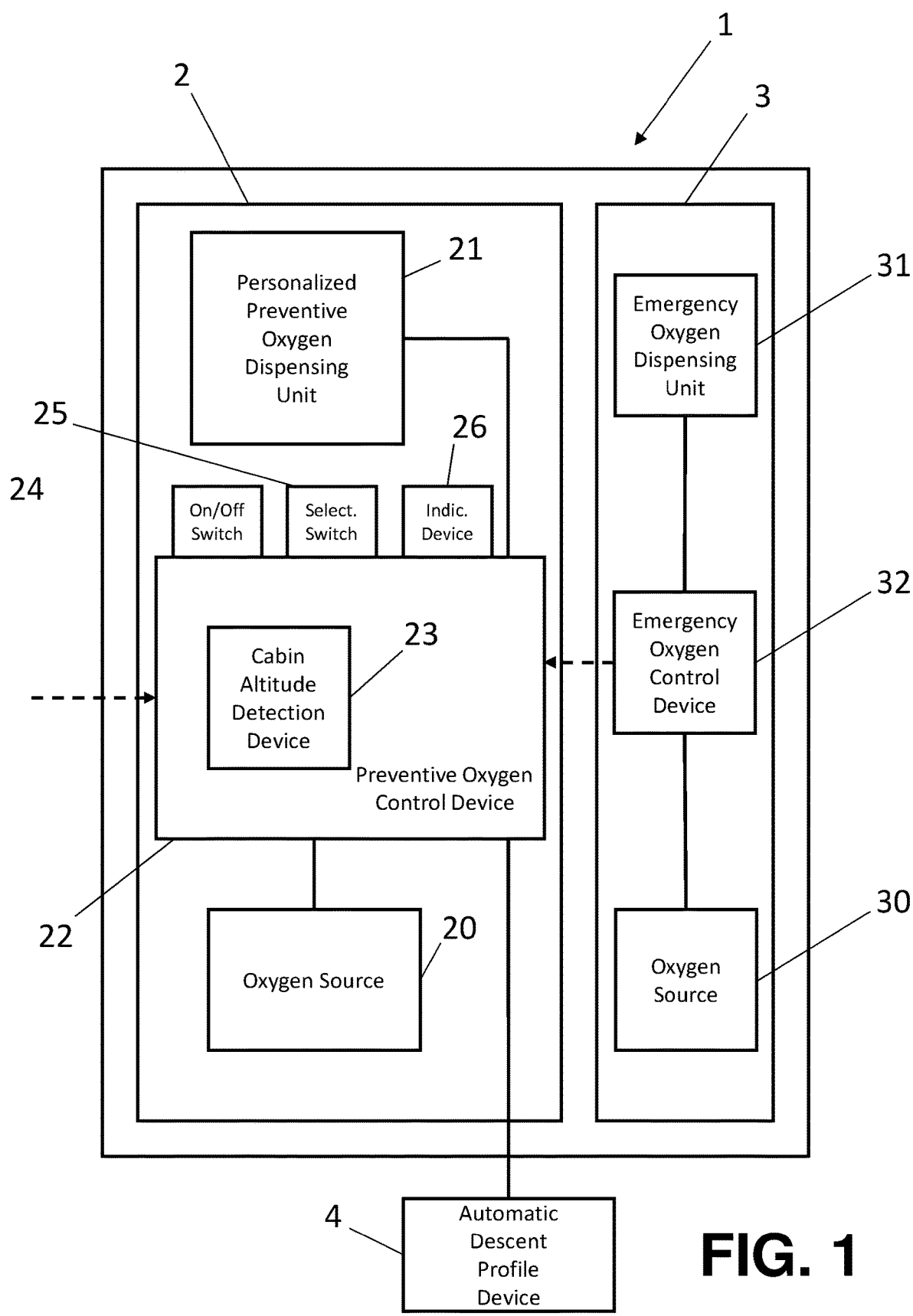
FIG. 1 shows a schematic illustration of an oxygen supply system for providing an adequate oxygen supply mode in an aircraft according to a first aspect of the present disclosure.

With reference to FIG. 1 of the drawings, an exemplary embodiment of an oxygen supply system 1 for an aircraft according to the first aspect of the present disclosure is schematically shown. In the shown exemplary embodiment, the oxygen supply system 1 comprises a first oxygen supply system being provided as a preventive oxygen supply system 2 and a second oxygen supply system being provided as an emergency oxygen supply system 3.

In the shown exemplary embodiment according to FIG. 1, the preventive oxygen supply system 2 comprises an oxygen source 20 consisting of or comprising for example of a high pressure oxygen cylinder in particular with associated valves or of an on-board oxygen generating system. It is apparent for a person skilled in the art that a combination of the both before mentioned embodiments is also possible. According to a further embodiment the oxygen source 20 is shared with another oxygen system, in particular with the above-mentioned emergency oxygen supply system 3.

According to the exemplary embodiment according to FIG. 1, the preventive oxygen supply system 2 further comprises a preventive oxygen dispensing unit 21 being connectable to the preventive oxygen supply system 2 by a respective conduit. For example, the preventive oxygen dispensing unit 21 of the preventive oxygen supply system 2 is connectable to the oxygen source 20 by a mechanical connection, in particular by a bayonet nut connector or the same. It is apparent for a person skilled in the art that any other connection might also be possible.

For example, the preventive oxygen dispensing unit 21 consists of or comprises a light soft mask similar to the ones being used in the medical field or of a nasal cannula. Preferably, the preventive oxygen dispensing unit 21 is personalized such that each user, in particular the respective pilot or copilot, carries his own preventive oxygen dispensing unit 21 belonging merely to him. Advantageously, these personalized preventive oxygen dispensing units 21 are not shared with other pilots providing an increased health, hygiene and comfort. More preferably, several sizes of these personalized preventive oxygen dispensing unit 21 can be made available to ensure the best fit and maximum comfort to the single users.

The preventive oxygen supply system 2 according to the embodiment as depicted in FIG. 1 further comprises a preventive oxygen control device 22 controlling a specific control valve and being preferably integrated in the aircraft system of the cockpit. Further, the preventive oxygen control device 22 preferably comprises a cabin altitude detection device 23 receiving a cabin altitude signal, for example from a device being part of the on-board electronic. It is also possible that the cabin altitude detection device 23 measures the cabin altitude by itself without receiving an external signal.

According to the embodiment as depicted in FIG. 1, the preventive oxygen control device 22 further comprises an on/off-switch 24. In particular, the preventive oxygen control device 22 can be manually controlled by for example the pilot through a cockpit switch to open or to shut-off the oxygen supply. It is apparent for a person skilled in the art that instead of a manual switch any other well-known mechanism would also be applicable to the present system alternatively.

Additionally, the preventive oxygen control device 22 according to the embodiment as depicted in FIG. 1 comprises a further switch in form of a preventive mode selection switch 25 for selecting a specific preventive mode of the preventive oxygen supply system 2. In particular, the preventive mode selection switch 25 can also be manually controlled by a user, in particular the pilot or copilot. Again, it is also possible to integrate an automatic selection of the respective mode depending on specific conditions for example in the cockpit.

In case the preventive mode selection switch 25 is switched to a so-called pre-wear mode, according to a preferred embodiment of the present disclosure, no additional oxygen flow is provided to the preventive oxygen dispensing unit 21. Instead the preventive oxygen dispensing unit supplies normal cabin air to the pilot. Providing merely a very small amount of oxygen flow shall be included in the expression "no additional oxygen flow".

On the other hand, in case the preventive mode selection switch 25 is switched to a so-called pre-oxygenation mode, according to a preferred embodiment of the present disclosure, oxygen is supplied at a rate adequate for pre-oxygenation of the pilot. Hence, in the pre-oxygenation mode, the drop of oxygen partial pressure in the alveoli at the onset of a decompression is minimized. Thus, the flow supply will also be optimized to minimize the oxygen to be taken on board, for example with a pulsed oxygen supply. A method for providing an adequate oxygen supply mode using the above evaluated system according to a preferred embodiment is described further down while referring to FIG. 2.

The preventive oxygen control device 22 according to the embodiment as depicted in FIG. 1 further comprises an internal switch for preferably automatically switching on a so-called decompression mode in case the control valve of the preventive oxygen control device 22 is open and an abnormal cabin altitude is detected. In this mode, the control valve in particular automatically switches to a full flow of high concentrated oxygen, additionally with positive pressure if required, at a sufficient rate at the onset of a decompression in the cockpit in order to ensure a minimum oxygenation of the pilot and in order to enable the pilot to adequately switch to the emergency oxygen supply system 3 manually.

Preferably, the preventive oxygen control device 22 further comprises an indicating device 26, for example in form of a display or in form of a light-emitting diode or the same, in order to indicate to the pilot that the decompression mode has been automatically activated. It is apparent for a person skilled in the art that alternatively or additionally further indication signals can be generated by the indicating device 26, for example a haptic or an audio warning signal or the same.

According to a further embodiment of the present disclosure, the preventive oxygen control device 22 of the preventive oxygen supply system 2 is connected to an automatic descent profile device 4, in particular being part of the aircraft system, in order to initialize an emergency descent in case the preventive oxygen control device 22 has switched to the decompression mode.

The emergency oxygen supply system 3 according to exemplary embodiment as illustrated in FIG. 1 also comprises an oxygen source 30 for providing oxygen to the user consisting of or comprising for example a high pressure oxygen cylinder, in particular with associated valves, or an on-board oxygen generating system. A combination of these two alternatives is also possible. According to a further preferred embodiment the oxygen source 20 of the preventive oxygen supply system 2 and the oxygen source 30 of the emergency oxygen supply system 3 are connected with each other such that they at least partly share the same oxygen reservoir.

Furthermore, according to a further embodiment, the preventive oxygen supply system 2 and the emergency oxygen supply system 3 might be connected to each other for sharing information regarding the respective conditions of the single systems. In particular, specific functions of one system are activated or deactivated depending on the condition of the further system. For example, in case the emergency oxygen supply system 3 is manually activated by the pilot, a signal can be generated and transmitted to the preventive oxygen supply system 2 indicating the correct functioning of the emergency oxygen supply system 3 wherein after receiving that signal the preventive oxygen supply system 2 shuts down automatically. For example, such a signal is generated and transmitted to the preventive oxygen supply system 2 just in case the emergency oxygen supply system 3 functions correctly over a predetermined time period.

As illustrated in FIG. 1, the emergency oxygen supply system 3 according to preferred embodiment of the present disclosure comprises an emergency oxygen control device 32 for controlling different functions of the emergency oxygen supply system 3 and for generating and transmitting respective signals to the preventive oxygen supply system 2 and/or to the pilot.

Figure 2:
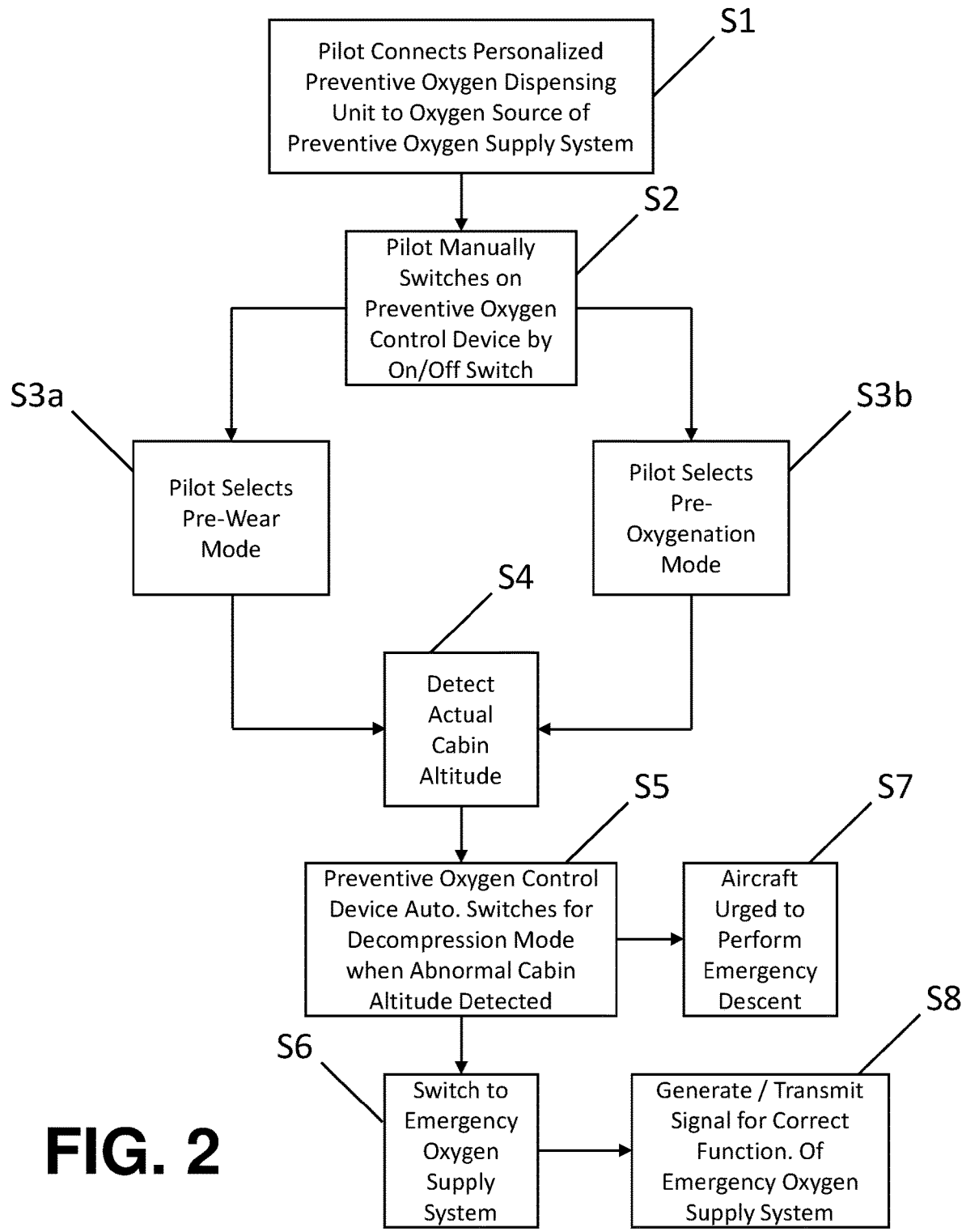
FIG. 2 shows a flowchart for illustrating an exemplary embodiment of a method for providing an adequate oxygen supply mode in an aircraft according to a second aspect of the present disclosure.

In the following, a method for providing an adequate oxygen supply mode to a pilot of an aircraft will be described in more detail referring to FIG. 2.

For operating the oxygen supply system 1 according to an embodiment of the present disclosure, according to a first step S1, the pilot connects his personalized preventive oxygen dispensing unit 21 to the oxygen source 20 of the preventive oxygen supply system 2, in particular by a bayonet nut connector or the same. Further, the pilot puts on his personalized preventive oxygen dispensing unit 21 for use.

That followed, in a second step, the pilot manually switches on the preventive oxygen control device 22 by the respective on/off-switch 24. Thus, the pilot can manually control the control valve of the preventive oxygen control device 22 through a cockpit switch to open or to close the oxygen supply. This step is referenced in the exemplary flowchart of FIG. 2 with S2.

As a subsequent step S3a or S3b the pilot manually selects the adequate and/or required preventive mode of the preventive oxygen control device 22. The preventive mode can be put either in a pre-wear mode wherein no additional oxygen flow is provided to the preventive oxygen dispensing unit 21 and wherein normal cabin air is provided to the pilot. Alternatively, the pilot can manually select a pre-oxygenation mode wherein, in this mode, oxygen is supplied at a rate adequate for pre-oxygenation. Whether the pilot selects the pre-wear mode or the pre-oxygenation mode depends for example on national flight regulations, the type of aircraft, the number and qualification of the single crew members and so on. For example, according to specific flight regulations, the pre-wear mode has to be selected in case a flight level FL410 has been reached, i.e. the aircraft has reached 41,000 feet.

According to a step S4, the cabin altitude detection device 23 of the preventive oxygen supply system 2 detects the actual cabin altitude wherein the corresponding preventive oxygen control device 22 determines whether a predetermined cabin altitude threshold has been reached depending on values of specific variables.

That followed, the preventive oxygen control device 22 automatically switches to the decompression mode in case an abnormal cabin altitude is detected by the cabin altitude detection device 23 according to a step S5. In particular, in case a predetermined cabin altitude threshold is reached and detected by the preventive oxygen control device 22 the preventive oxygen control device 22 automatically switches to the decompression mode wherein a full flow of high concentrated oxygen, additionally with positive pressure if required, at the onset of decompression at a sufficient rate is provided to the pilot in order to ensure a minimum oxygenation of the pilot and in order to enable the pilot to manually switch to the emergency oxygen supply system 3 and to use the emergency oxygen dispensing unit 31. The predetermined threshold might also depend on further parameters.

The pilot always takes notice of the current mode of the preventive oxygen supply system 2 by the indicating device 26 such that he will receive a warning signal for indicating the pilot to switch to the emergency oxygen supply system. Subsequently, in a step S6, the pilot receiving the warning signal by the indicating device 26 automatically switches to the emergency oxygen supply system 3 and uses the emergency oxygen dispensing unit 31. After reaching a normal cabin altitude again, the pilot is able to manually return to the preventive oxygen supply system 2 selecting the adequate preventive mode, if necessary.

According to a preferred embodiment of the described method, according to a step S7, the aircraft is urged to perform an emergency descent by an automatic descent profile device 4 in case the decompression mode has been activated by the preventive oxygen control device 22.

According to a further preferred embodiment of the described method, according to a step S8, a signal indicating a correct functioning of the emergency oxygen supply system 3 can be generated and transmitted to the preventive oxygen control device 22 of the preventive oxygen supply system 2 for shutting off the preventive oxygen supply system 2 in order to save oxygen of the overall oxygen supply system 1. For example, a predetermined time period can be defined wherein a correct functioning of the emergency oxygen supply system 3 over this predetermined time period is detected and wherein a signal indicating the correct functioning is generated and transmitted to the preventive oxygen supply system 2 after this period has lapsed.

This disclosure herein is not limited to the embodiments described above by way of non-limitative examples and to the variants cited. It also relates to all the embodiment variants within the capacity of the individual skilled in the art. In particular, the sequence of the single method steps is not limiting the scope of protection since it is also possible to change the above evaluated sequence in case it seems advantageously to a person skilled in the art.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. An oxygen supply system for providing an adequate oxygen supply mode in an aircraft, the oxygen supply system comprising:
    a preventive oxygen supply system comprising:
        a preventive oxygen source comprising a first high pressure oxygen cylinder and/or an on-board oxygen generating system;
        a preventive oxygen dispenser for each user that is connectable to the preventive oxygen source;
        a cabin altitude detector; and
        a preventive oxygen controller configured to provide at least the following modes:
            a pre-wear mode in which only cabin air is provided to a user via the preventive oxygen dispenser and in which no oxygen from the preventive oxygen source is provided to the preventive oxygen dispenser, wherein the pre-wear mode is user-selectable using a preventive mode selection switch;
            a pre-oxygenation mode, which is user-selectable using the preventive mode selection switch, for providing a predetermined rate of oxygen from the preventive oxygen source to the preventive oxygen dispenser sufficient for generating a pre-oxygenation condition of the user; and
            a decompression mode for providing concentrated oxygen from the preventive oxygen source to the preventive oxygen dispenser sufficient for ensuring a minimum oxygenation of the user;
        wherein the preventive oxygen controller is configured to automatically switch to the decompression mode when a predetermined cabin altitude threshold is detected by the cabin altitude detector; and
        wherein the preventive mode selection switch is configured for manual control by the user; and
    an emergency oxygen supply system comprising:
        an emergency oxygen source comprising a second high pressure oxygen cylinder; and
        an emergency oxygen mask that is automatically provided with oxygen from the emergency oxygen source and is configured to provide the oxygen from the emergency oxygen source to the user when the emergency oxygen mask is used by the user;
    wherein the preventive oxygen source and the emergency oxygen source are connected with each other, such that the preventive oxygen supply system and the emergency oxygen supply system at least partly share a same oxygen source; and
    wherein the preventive oxygen controller is coupled to the emergency oxygen supply system, such that the preventive oxygen controller shuts down automatically upon receipt of a signal indicating that the emergency oxygen supply system is functioning properly.

2. The oxygen supply system according to claim 1, wherein each preventive oxygen dispenser comprises a mask or a nasal cannula.

3. The oxygen supply system according to claim 1, wherein each preventive oxygen dispenser is a personalized preventive oxygen dispenser.

4. The oxygen supply system according to claim 3, wherein each personalized preventive oxygen dispenser is adapted in size, fit, and/or comfort to meet specific needs of each user.

5. The oxygen supply system according to claim 1, wherein each preventive oxygen dispenser is connectable to the preventive oxygen source by a mechanical connection.

6. The oxygen supply system according to claim 1, wherein the preventive oxygen controller comprises a manual switch for switching on and/or switching off the preventive oxygen supply system.

7. The oxygen supply system according to claim 1, wherein the preventive oxygen controller comprises an indicator for indicating a current mode of the preventive oxygen controller.

8. The oxygen supply system according to claim 7, wherein the indicator is configured to display a visual signal by a display or LED lamp.

9. The oxygen supply system according to claim 1, wherein the oxygen supply system is coupled within an automatic descent profile controller configured to allow the aircraft to perform an emergency descent when the decompression mode of the preventive oxygen controller is activated.

10. A method for providing an adequate oxygen supply mode in an aircraft, the method comprising:
    providing the aircraft with an oxygen supply system having a preventive oxygen supply system comprising:
        a preventive oxygen source comprising a first high pressure oxygen cylinder and/or an on-board oxygen generating system;
        a preventive oxygen dispenser for each user that is connectable to the preventive oxygen source;
        a cabin altitude detector; and
        a preventive oxygen controller,
    wherein the preventive oxygen controller is configured to provide at least the following modes:
        a pre-wear mode in which only cabin air is provided to a user via the preventive oxygen dispenser and in which no oxygen from the preventive oxygen source is provided to the preventive oxygen dispenser, wherein the pre-wear mode is user-selectable using a preventive mode selection switch;
        a pre-oxygenation mode, which is user-selectable using the preventive mode selection switch, for providing a predetermined rate of oxygen from the preventive oxygen source to the preventive oxygen dispenser sufficient for generating a pre-oxygenation condition of the user; and
        a decompression mode for providing concentrated oxygen from the preventive oxygen source to the preventive oxygen dispenser sufficient for ensuring a minimum oxygenation of the user; and wherein the preventive mode selection switch is manually controllable by the user;

automatically switching, when a predetermined cabin altitude threshold is detected by the cabin altitude detector, the preventive oxygen controller to the decompression mode;

providing the oxygen supply system with an emergency oxygen supply system comprising an emergency oxygen source, which comprises a second high pressure oxygen cylinder, and an emergency oxygen mask;

connecting the preventive oxygen source and the emergency oxygen source with each other, such that the preventive oxygen supply system and the emergency oxygen supply system at least partly share a same oxygen source; and automatically providing the emergency oxygen mask with oxygen from the emergency oxygen source, such that the oxygen from the emergency oxygen is provided to the user when the emergency oxygen mask is used by the user;

wherein the preventive oxygen controller is coupled to the emergency oxygen supply system, such that the preventive oxygen controller shuts down automatically upon receipt of a signal indicating that the emergency oxygen supply system is functioning properly.

11. The method according to claim 10, wherein a selection of whether the pre-wear mode or the pre-oxygenation mode is used is made manually by the user.

12. The method according to claim 10, wherein the cabin altitude threshold is determined depending on national flight regulations, an aircraft type, and/or a number of crew members.

13. The method according to claim 10, comprising performing an emergency descent, by an automatic descent profile controller, when the decompression mode of the preventive oxygen controller is activated.

14. An aircraft comprising an oxygen supply system for providing an adequate oxygen supply mode in the aircraft, the oxygen supply system comprising:

a preventive oxygen supply system comprising:

a preventive oxygen source comprising a first high pressure oxygen cylinder and/or an on-board oxygen generating system;

a preventive oxygen dispenser for each user that is connectable to the preventive oxygen source;

a cabin altitude detector; and a preventive oxygen controller configured to provide at least the following modes:

a pre-wear mode in which only cabin air is provided to a user via the preventive oxygen dispenser and in which no oxygen from the preventive oxygen source is provided to the preventive oxygen dispenser, wherein the pre-wear mode is user-selectable using a preventive mode selection switch;

a pre-oxygenation mode, which is user-selectable using the preventive mode selection switch, for providing a predetermined rate of oxygen from the preventive oxygen source to the preventive oxygen dispenser sufficient for generating a pre-oxygenation condition of the user; and a decompression mode for providing concentrated oxygen from the preventive oxygen source to the preventive oxygen dispenser sufficient for ensuring a minimum oxygenation of the user;

wherein the preventive oxygen controller is configured to automatically switch to the decompression mode when a predetermined cabin altitude threshold is detected by the cabin altitude detector; and wherein the preventive mode selection switch is configured for manual control by the user; and an emergency oxygen supply system comprising:

an emergency oxygen source comprising a second high pressure oxygen cylinder; and an emergency oxygen mask that is automatically provided with oxygen from the emergency oxygen source and is configured to provide the oxygen from the emergency oxygen source to the user when the emergency oxygen mask is used by the user;

wherein the preventive oxygen source and the emergency oxygen source are connected with each other, such that the preventive oxygen supply system and the emergency oxygen supply system at least partly share a same oxygen source; and wherein the preventive oxygen controller is coupled to the emergency oxygen supply system, such that the preventive oxygen controller shuts down automatically upon receipt of a signal indicating that the emergency oxygen supply system is functioning properly.

* * * * *